(12) United States Patent
Rowe

(10) Patent No.: US 8,770,147 B2
(45) Date of Patent: Jul. 8, 2014

(54) ANIMAL WATERING DEVICE

(75) Inventor: Sean Rowe, Reno, NV (US)

(73) Assignee: Radio Systems Corporation, Knoxville, TN (US)

( * ) Notice: Subject to any disclaimer, the term of this patent is extended or adjusted under 35 U.S.C. 154(b) by 278 days.

(21) Appl. No.: 13/345,261

(22) Filed: Jan. 6, 2012

(65) Prior Publication Data

US 2012/0216751 A1     Aug. 30, 2012

Related U.S. Application Data

(60) Provisional application No. 61/446,532, filed on Feb. 25, 2011.

(51) Int. Cl.
*A01K 7/00* (2006.01)
*A01K 7/02* (2006.01)
*A01K 63/04* (2006.01)

(52) U.S. Cl.
CPC ............... *A01K 63/045* (2013.01); *A01K 7/00* (2013.01); *A01K 7/02* (2013.01)
USPC .......................................................... 119/74

(58) Field of Classification Search
USPC ..................... 119/72, 74–80, 51.5
See application file for complete search history.

(56) References Cited

U.S. PATENT DOCUMENTS

| | | |
|---|---|---|
| 1,278,285 A | 9/1919 | Allen |
| 1,481,365 A | 1/1924 | Ehgel |
| 2,103,653 A | 12/1937 | Weil |
| 2,034,968 A | 3/1939 | Bartlett |
| 2,366,766 A | 1/1945 | Brodsky |
| 2,510,252 A | 1/1945 | Pine |
| 2,510,446 A | 6/1950 | Weil |
| 2,572,379 A | 10/1951 | Pearse |
| 2,678,630 A | 5/1954 | Frederiksen |
| 2,726,636 A | 12/1955 | Frederiksen |
| 2,775,227 A | 12/1956 | Millies |
| 2,878,781 A | 3/1959 | Wingfield |
| 3,179,085 A | 4/1965 | McKillip |
| 3,228,377 A | 1/1966 | Grassano |
| 3,272,181 A | 9/1966 | Ramsey |
| 3,459,159 A | 8/1969 | Reed |
| 3,505,978 A | 4/1970 | Nilsen |
| 3,537,430 A | 11/1970 | Peepler |
| 3,777,714 A | 12/1973 | Danielson |
| 3,831,558 A | 8/1974 | Forbes |
| 3,853,429 A | 12/1974 | Wiedenmann |
| 3,868,926 A | 3/1975 | Olde |
| 3,901,191 A | 8/1975 | Smith |
| 3,903,845 A | 9/1975 | Little |
| 4,022,159 A | 5/1977 | Slavia |
| 4,098,229 A | 7/1978 | Haynes et al. |

(Continued)

*Primary Examiner* — Kristen C Hayes

(74) *Attorney, Agent, or Firm* — Peter L. Brewer; Baker Donelson

(57) ABSTRACT

Disclosed is a watering device for animals and a method of producing the same, including a base unit defining a bowl portion, a housing portion disposed in the base unit and including an inlet port and an outlet port in fluid communication with the bowl portion, a dispensing unit proximate the outlet port to dispense water from the housing portion to the bowl portion via the outlet port such that water flows around the bowl portion to the housing portion via the inlet port, and a filtering unit interposed between the outlet port and the inlet port to filter the water flowing from the bowl portion to the housing portion via the inlet port.

18 Claims, 4 Drawing Sheets

(56) References Cited

U.S. PATENT DOCUMENTS

| | | | |
|---|---|---|---|
| 4,248,177 A | 2/1981 | Peterson et al. | |
| 4,347,809 A | 9/1982 | Goggler | |
| 4,386,582 A | 6/1983 | Adsit | |
| 4,469,049 A | 9/1984 | Waynick | |
| 4,512,885 A | 4/1985 | Willinger | |
| 4,573,433 A | 3/1986 | Thompson | |
| 4,584,966 A | 4/1986 | Moore | |
| 4,705,216 A | 11/1987 | Kaffka et al. | |
| 4,747,538 A | 5/1988 | Dunn et al. | |
| 4,807,565 A | 2/1989 | Hawthorne | |
| 4,836,142 A | 6/1989 | Duback | |
| 4,924,812 A | 5/1990 | Bernays | |
| 4,976,220 A | 12/1990 | Gershan | |
| 5,052,343 A | 10/1991 | Sushelnitski | |
| 5,167,368 A | 12/1992 | Nash | |
| 5,329,876 A | 7/1994 | Tracy | |
| D350,842 S | 9/1994 | VanSkiver | |
| D367,735 S | 3/1996 | VanSkiver et al. | |
| 5,501,178 A | 3/1996 | Kemp | |
| D374,516 S | 10/1996 | Lillelund | |
| 5,637,361 A | 6/1997 | Scheurich | |
| D383,797 S | 9/1997 | Finnegan | |
| 5,799,609 A | 9/1998 | Burns et al. | |
| 5,842,437 A | 12/1998 | Burns | |
| 6,055,934 A | 5/2000 | Burns et al. | |
| D428,217 S | 7/2000 | Rodack et al. | |
| 6,149,070 A | 11/2000 | Hones | |
| D435,321 S | 12/2000 | Avila | |
| 6,257,560 B1 | 7/2001 | Kim | |
| D457,692 S | 5/2002 | Skurdalsvold et al. | |
| 6,460,483 B1 * | 10/2002 | Northrop et al. | 119/74 |
| 6,467,428 B1 | 10/2002 | Andrisin et al. | |
| 6,526,916 B1 | 3/2003 | Perlsweig | |
| 6,622,657 B2 * | 9/2003 | Northrop et al. | 119/74 |
| 6,655,934 B2 | 12/2003 | Mittelstein et al. | |
| 6,748,699 B2 | 6/2004 | Taylor | |
| 6,792,891 B1 | 9/2004 | Coburn et al. | |
| 7,089,881 B2 * | 8/2006 | Plante | 119/74 |
| 7,270,082 B2 | 9/2007 | Plante | |
| 7,430,988 B2 | 10/2008 | Perlsweig et al. | |
| 7,757,636 B2 | 7/2010 | McCallum et al. | |
| 7,918,186 B2 | 4/2011 | Rowe et al. | |
| D637,770 S | 5/2011 | Lipscomb et al. | |
| 7,958,844 B1 * | 6/2011 | Northrop | 119/74 |
| D642,745 S | 8/2011 | Veness et al. | |
| D642,746 S | 8/2011 | Weber | |
| 7,987,817 B2 | 8/2011 | Johnson | |
| D658,819 S | 5/2012 | Lipscomb et al. | |
| D659,914 S | 5/2012 | Lipscomb | |
| 8,171,885 B1 * | 5/2012 | Northrop et al. | 119/74 |
| D665,134 S | 8/2012 | Lipscomb et al. | |
| 8,245,665 B2 | 8/2012 | Willett | |
| D677,018 S | 2/2013 | Miller et al. | |
| 8,381,685 B2 | 2/2013 | Lipscomb et al. | |
| 2004/0118356 A1 * | 6/2004 | Krishnamurthy | 119/74 |
| 2011/0259273 A1 | 10/2011 | Lipscomb et al. | |
| 2012/0017839 A1 | 1/2012 | Veness et al. | |
| 2013/0087102 A1 * | 4/2013 | Lipscomb et al. | 119/74 |

* cited by examiner

ANIMAL WATERING DEVICE

CROSS-REFERENCE TO RELATED APPLICATIONS

This application claims priority from U.S. Provisional Patent Application No. 61/446,532, filed on Feb. 25, 2011, the contents of which are hereby incorporated by reference herein.

STATEMENT REGARDING FEDERALLY-SPONSORED RESEARCH OR DEVELOPMENT

Not Applicable.

BACKGROUND OF THE INVENTION

1. Field of Inventive Concept

The present general inventive concept relates generally to an animal watering device, and more particularly, to an animal watering device having a submersible water filter and dispensing unit to continuously circulate water around a water bowl, and a method of producing the same, allowing the water to remain clean and fresh, as well as in constant motion for the animal to drink.

2. Background of Inventive Concept

Many animals have a preference for drinking flowing water. Flowing water may provide a number of advantages, including improved taste and quality. Flowing water also typically has more dissolved oxygen, which can make the water taste better as well as provide potential health benefits. For example, one health benefit of flowing water is that it may encourage animals to drink more liquid. Increased water intake can help reduce problems with the animal's kidneys or urinary tract. In addition to these benefits, running water is interesting and entertaining to many animals.

Many household pet owners have recognized that their pets are drawn towards running water. Many dogs like to drink from hoses, streams, or water flowing along a curb. Cats often jump on counters and sinks in order to drink from a running or leaking faucet. Some pet owners even deliberately accommodate such behavior, for example, by letting a hose or faucet drip.

However, many animals do not have adequate access to a source of running water. Animals may engage in undesirable behavior in search of running water, such as jumping on counters or in bath tubs. Owners who do provide running water for their animals may incur significant expense by leaving faucets or hoses running.

Pet fountains have been developed to provide running water to pets. For example, Veterinary Ventures, Inc., of Reno, Nev., offers a variety of pet fountains, such as the Drinkwell® and Drinkwell® Big Dog products. Such fountains typically include a water reservoir, an elevated spout that dispenses water, and a bowl into which the water is dispensed and from which the animal can drink. Some fountains provide a stream of free falling water, which can help stimulate animals' interest in the fountain as well as enhance water oxygenation.

One of the challenges facing known pet fountains is to provide a constant flow of fresh and clean running water. For example, some fountains can accumulate debris such as hair and food, particularly if the owner does not adequately maintain the fountain. Such debris can reduce water quality and impair water circulation in the fountain, for example, by clogging an intake or outtake of a pump. If the water circulation is sufficiently impaired, a water circulation device may be damaged. In addition, some prior fountains contain pumps having at least portions that should not be in contact with water, potentially making cleaning of the fountain more difficult.

If fountains are not properly maintained, the benefits of animal watering fountains can be reduced or even reversed. However, typical fountains often have a large number of parts that need to be removed and reassembled during routine maintenance of the fountain. For example, an upper water dispensing portion is typically removable from a lower bowl portion. Reassembling this structure can be difficult for some users. Further, the water circulation device of such fountains is often not easily accessible by the user, and thus not adequately cleaned.

In order to improve the quality of the water provided to animals drinking from the pet fountains, some prior fountains are designed to accept filters. Such filters typically contain a quantity of an impurity-absorbing material, such as activated carbon. However, such material can have a tendency to settle into the bottom portion of the filter, reducing the effectiveness of the filter, as water that circulates through other portions of the filter does not contact the absorbing material.

Embodiments of the present general inventive concept provide as an easily-maintained animal watering device that provides substantially continuously-moving, filtered, drinking water for animals without components that are compromised when exposed to water.

BRIEF SUMMARY OF THE INVENTION

Example embodiments of the present general inventive concept can provide a submersible water filter and dispensing unit arrangement for use in combination with an animal water bowl. The arrangement can be located toward a middle portion of the watering bowl to direct water into the watering bowl at one end, and to draw water from the bowl through a filter at the other end. After the water is filtered, the dispensing unit can dispense the water back into the bowl through an aperture positioned on the bottom of the water bowl such that the water flows around that the bowl. The filtered water can thus be made to flow in such a way to circulate the water around the bowl, allowing the water to remain clean, fresh, and in constant motion for the animal to drink. The circulation can also help enhance water oxygenation.

Example embodiments of the present general inventive concept can be achieved by providing a watering device for animals, including a base unit defining an interior bowl portion, a housing portion disposed in the base unit and including an inlet port and an outlet port in fluid communication with the bowl portion, a dispensing unit communicating with the outlet port to dispense water from the housing portion to the bowl portion via the outlet port such that water circulates around the bowl portion to the housing portion via the inlet port, and a filtering unit interposed between the outlet port and the inlet port to filter the water flowing from the bowl portion to the housing portion via the inlet port.

The housing portion can include a circular portion located proximate the center of the bowl portion and a neck portion extending between an inner wall of the bowl portion and the circular portion. The neck portion can have opposing sides to define the inlet port and the outlet port, respectively. The housing portion can include a detachable cover portion to define a top surface of the circular portion, the detachable cover portion including grated members to define the inlet port and the outlet port, respectively. The circular portion can include an aperture to accommodate a power cord of the dispensing unit. The outlet port can be located adjacent to a bottom surface of the bowl portion. The bottom surface of the bowl portion can be sloped to encourage the flow of water around the bowl portion from the outlet port to the inlet port. A method is also disclosed, in accordance with various embodiments of the present general inventive concept, for producing an animal watering device having constantly circulating, filtered water.

The example embodiments described and illustrated herein are representative of exemplary structures and techniques designed to carry out the features of the present general inventive concept, but the present general inventive concept is not limited to these example embodiments. A wide variety of additional embodiments will be more readily understood and appreciated by those skilled in the art with reference to the accompanying figures. For example, the illustrations and descriptions provided herein can be used to implement exemplary embodiments of the present general inventive concept, and are included for illustrative purposes to convey the possible applications and methods of making and using the techniques and devices of the present general inventive concept.

BRIEF DESCRIPTION OF THE DRAWINGS

The above-mentioned and additional features of the invention will become more clearly understood from the following detailed description of the invention read together with the drawings in which.

DETAILED DESCRIPTION OF THE INVENTION

Figure 1:
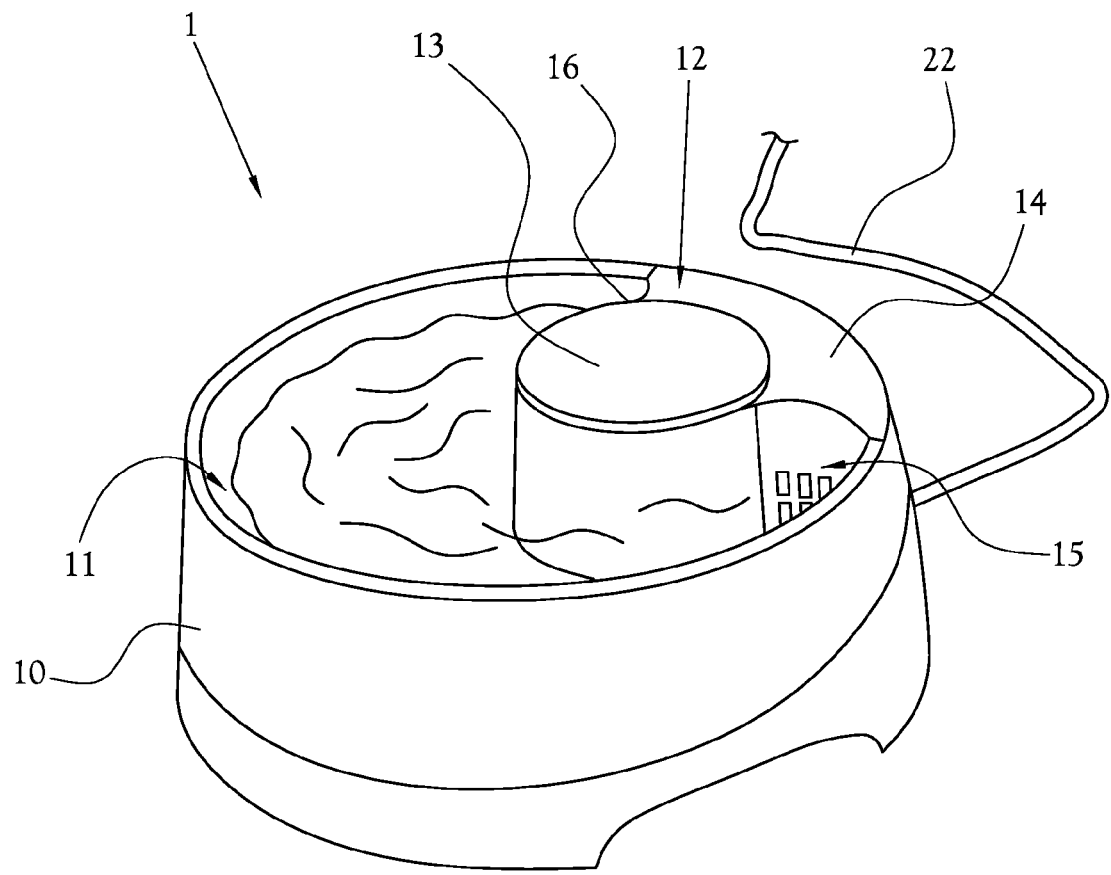
FIG. 1 illustrates a perspective view of an example embodiment of the present invention in which the animal watering device is filled with water.
Figure 2:
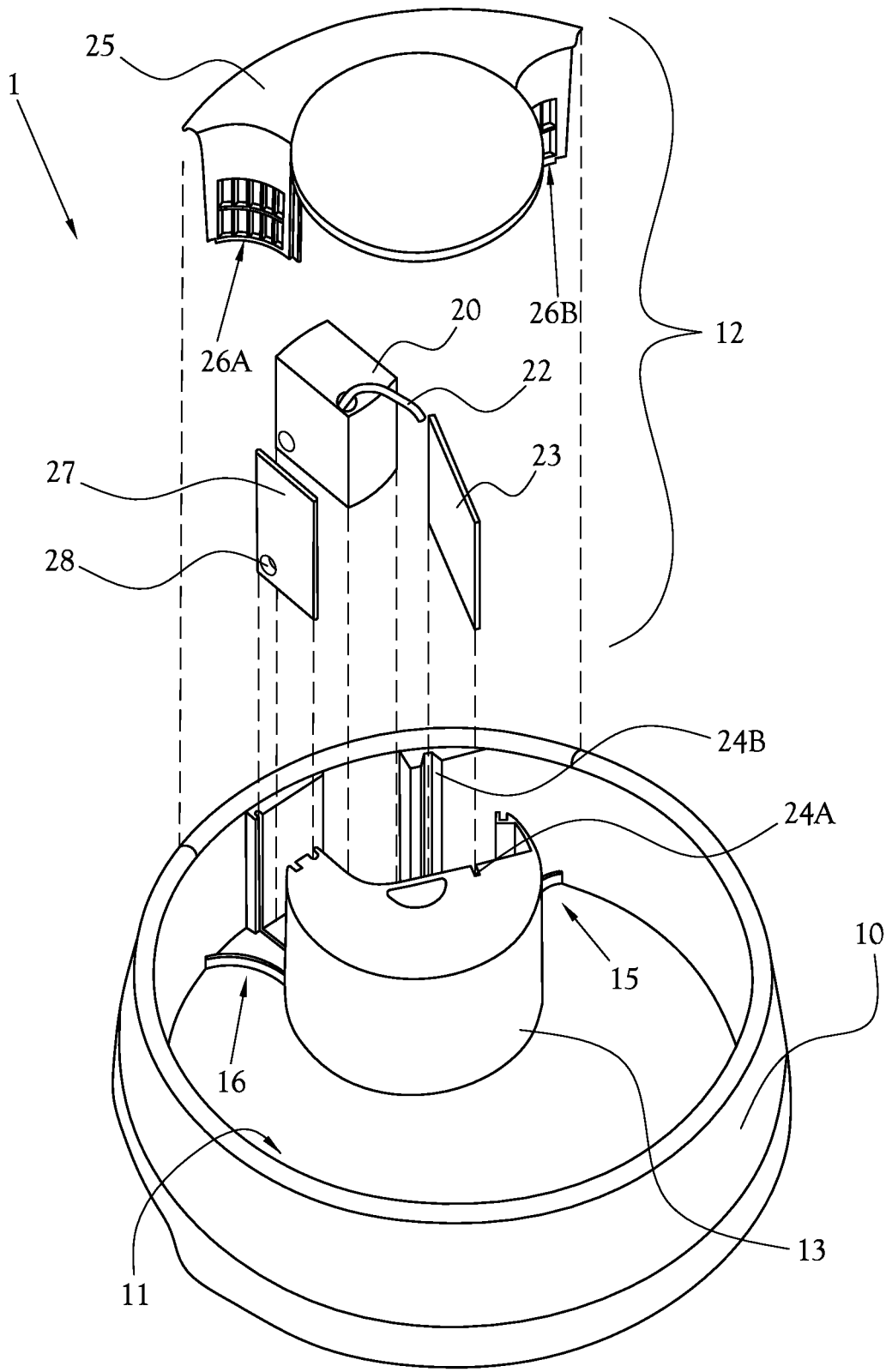
FIG. 2 illustrates a perspective view of an example embodiment of the present invention with the housing portion exploded to expose the various component parts.
Figure 3:
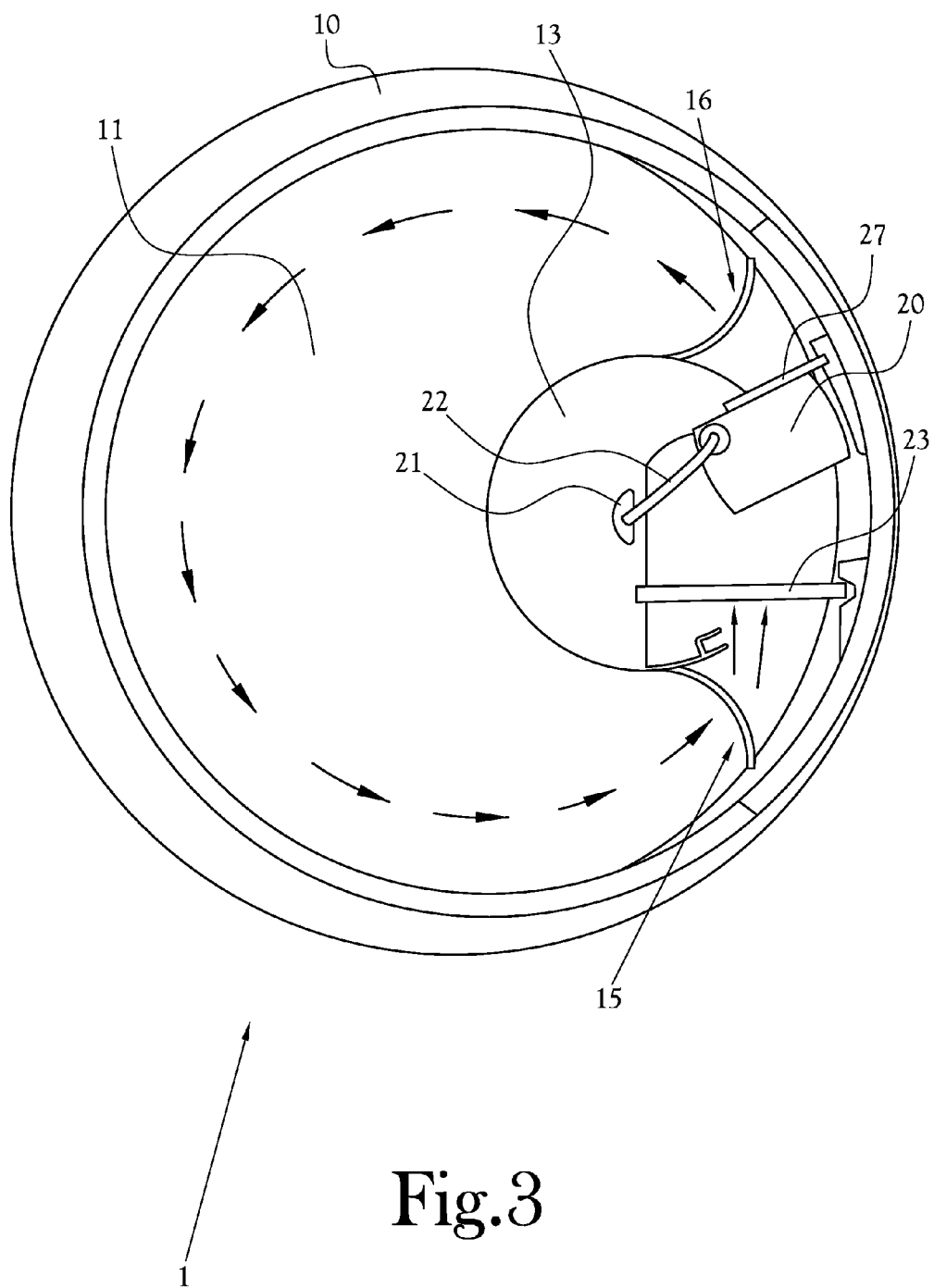
FIG. 3 is a top view of an example embodiment of the present invention with the arrows indicating the directional water flow achieved during operation of the animal watering device.

Referring to FIGS. 1-3, example embodiments of the animal watering device in accordance with the present general inventive concept are portrayed. As illustrated, included in the animal watering device 1 is a generally circular base unit 10 to define a watering bowl. The base unit 10 includes a recessed bowl portion 11 to facilitate drinking of water by an animal such as a household pet.

In the illustrated embodiments, a housing portion 12 is disposed in the base unit 10 such that the housing portion 12 protrudes from an inner wall of the watering bowl 11 to create an island-type configuration 13 located proximate the center of the watering bowl 11. The island-type configuration 13 is connected to an inner wall of the watering bowl 11 by a neck-portion 14, such that the neck-portion 14 defines an inlet port 15 and an outlet port 16 in fluid communication with the watering bowl 11.

As illustrated in FIG. 2, a dispensing unit 20, such as a generally rectangular water pump, can be configured to fit within a compartment of the housing portion 12. Other shapes and types of dispensing units 20 besides the illustrated water pump could also be used without departing from the broader scope and spirit of the present general inventive concept. For example, an agitator or the like can be used to dispense water in a selected direction out of the outlet port 16. In some embodiments, it is possible to provide an aperture 21 on a top surface of the generally circular housing portion 13 to receive and accommodate a power cord 22 for the dispensing unit 20. Those of ordinary skill, however, will recognize that the present invention is not limited to dispensing units with power cords. Dispensing units can be powered by any conventional means, such as, for example, a battery or solar power.

Water is added to the watering bowl 11 such that water becomes pooled inside the inner cavity region of the housing portion 12 and the watering bowl 11. In operation, the dispensing unit 20 can be powered to pump water and dispense the water from the housing portion 12 to the watering bowl 11 via the outlet port 16, as indicated by the direction arrows of FIG. 3. Once the water is pumped into the watering bowl 11, the water circulates around the watering bowl 11, encouraged by a sloped bottom of the watering bowl 11, and re-enters the housing portion at the inlet port 15 via the filter member 23. As illustrated in FIG. 2, the filter member 23 can take the form of a narrow diaphragm-like member installable into mating slots 24A, 24B near the inlet port 15 of the housing portion 12. The filter member 23 thus creates a permeable wall to filter the water as the water re-enters the housing portion 12 via the inlet port 15 after the water has been circulated completely around the watering bowl 11.

In some embodiments, for example referring to FIG. 2, the housing portion 12 can include a detachable cover member 25 to define a top surface of the circular portion 13 and the neck portion 14. Also included on the detachable cover member 25 of the neck portion 14 are grated members 26A, 26B at opposing sides of the neck portion 14 to define the inlet 15 and outlet 16 ports respectively to facilitate water flow therethrough. The cover member 25 can be provided as an integrated member, or in separate pieces, such that each piece is detachable from the housing portion 12 to facilitate maintenance, assembly, and cleaning of the device. FIG. 2 illustrates an exemplary, integrated cover member 25, which is removably installed to the housing portion 12.

In some embodiments, the animal watering device 1 also contains a sliding member 27 coupled to the dispensing unit 20 and slidably installed at the outlet port 16 to dispense water from the housing portion 12 to the water bowl 11. In the embodiment illustrated in FIG. 2, water is dispensed from the dispensing unit 20 where it flows through the aperture 28 included on the sliding member 27, positioned adjacent to a bottom surface of the watering bowl 11, and through the outlet port 16 of the housing portion 12. One of skill in the art will understand that the sliding member 27 is not necessarily required to practice the general present inventive concept. For instance, some embodiments can have a water pump that includes an outlet tube to direct the water out through the outlet port 16, thus obviating the need for the sliding member 27.

FIG. 3 illustrates the circulating operation of an animal drinking device according to an example embodiment of the present general inventive concept. Direction arrows mimic the directional water flow achieved by the animal watering device 1 during operation. Specifically, water in the water bowl 11 travels from the water bowl 11 through the inlet port 15 and filter member 23 and into the housing portion 12. Water is then dispensed by the dispensing unit 20 through the outlet port 16 and back into the water bowl 11. In the illustrated embodiment, a sliding member 27 is coupled to the dispensing unit 20 such that water is dispensed from the dispensing unit 20 through the aperture 28 on the sliding member 27, positioned adjacent to the bottom surface of the watering bowl 11, and out the outlet port 16.

Stated differently, water that becomes pooled inside the housing member 12 can be pumped into the watering bowl 11 via the outlet port 16 in order to circulate water around the watering bowl 11. When the water reaches the inlet port 15, the water can be communicated through the filter unit 23 and dispensed by the dispensing unit 20 through the outlet port 16, wherein the water is re-pooled and circulated around the watering bowl 11, repeatedly, thus providing a constant flow of clean, filtered water for the animal to drink.

Upon review of the exemplary figures, it is evident that the curvatures and slopes of the surfaces making contact with the water can be configured in shape and size to facilitate ease of water flow around water bowl 11. For example, the bottom surface of the water bowl 11 can be sloped to encourage positive flow of water around the water bowl 11 from the outlet port 16 to the inlet port 15. In some embodiments, the bottom surface of the watering bowl 11 is sloped inward so as to create a funnel-like shape to encourage the directional flow of water from the outlet port 16, around the watering bowl 11, and back to the inlet port 15.

Figure 4:
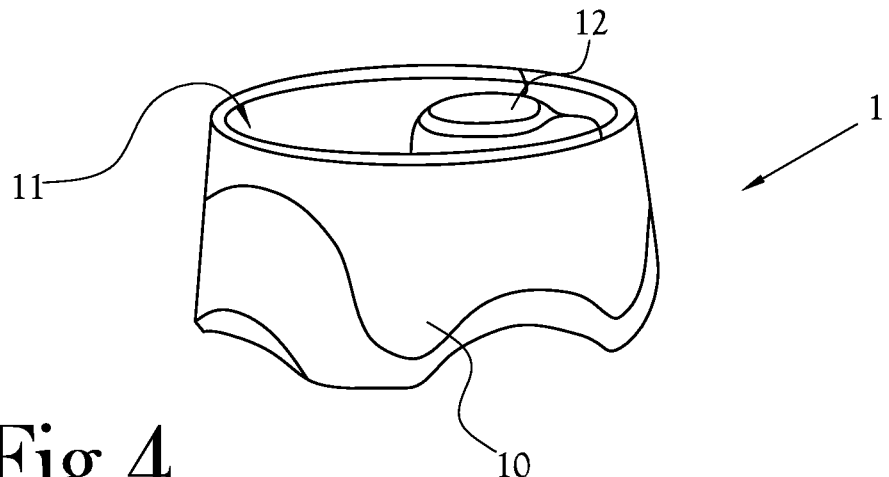
FIG. 4 illustrates alternate embodiments of the present invention.
Figure 5:
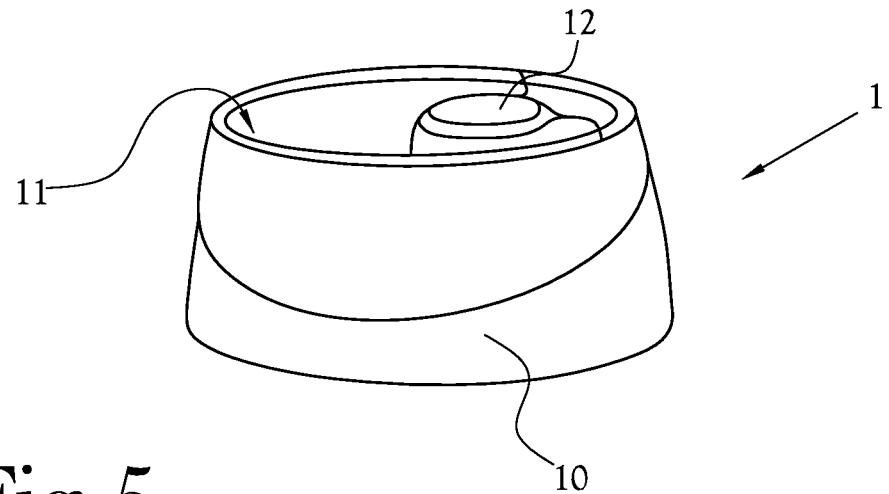
FIG. 5 illustrates alternate embodiments of the present invention.
Figure 6:
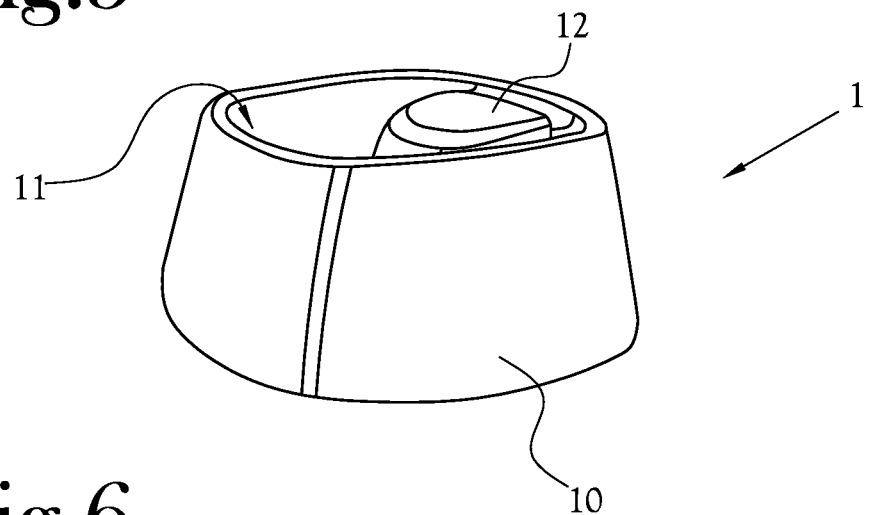
FIG. 6 illustrates alternate embodiments of the present invention.

FIGS. 4-6 illustrate various external configurations which can be selected for the base unit 10 and water bowl 11 without departing from the broader scope and spirit of the present general inventive concept.

For purposes of the present disclosure, it is noted that spatially relative terms, such as "up," "down," "right," "left," "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over or rotated, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

It is noted that the simplified diagrams and drawings do not illustrate all the various connections and assemblies of the various components, however, those skilled in the art will understand how to implement such connections and assemblies, based on the illustrated components, figures, and descriptions provided herein.

In view of the present disclosure, it is evident that embodiments of the present general inventive concept can provide animal watering devices having a number of advantages. For instance, the example embodiments can be easy to clean and maintain, such as by having parts which are easily removed or replaced. Indeed, certain embodiments include an easily removable debris filter, which may be a pre-filter that helps trap debris before water passes to the dispensing unit, additional filters, or both. It is possible to construct the detachable portions to include convenient slide-in or snap-on parts that can be easily removed, but which are secured against the base unit to prevent accidental removal or removal by a pet.

While various configurations can be implemented without departing from the broader scope of the present general inventive concept, the illustrated embodiments can provide a submersible water filter 23 and dispensing unit 20 arrangement for use in combination with a water bowl 11. In some embodiments, the filter 23 and dispensing unit 20 are located within a housing portion 12 protruding from an inner wall of the water bowl 11. The dispensing unit 20 can be a pump positioned adjacent to the outlet port 16 of the housing portion 12 to pump water into the water bowl 11, and the filter 23 can be interposed between the outlet port 16 and the inlet port 15. The pump can thereby draw water from the water bowl 11 into the housing portion 12 through the inlet port 15. After the water permeates through the filter 23, the pump can re-dispense the water back into the bowl 11 through the outlet port 16. In some embodiments, the pump dispenses water through a tube positioned adjacent to the bottom surface of the water bowl 11 parallel with the sides of the bowl 11. In this way, the water is continually circulated around the bowl 11, allowing the water to remain in constant motion.

The descriptions and drawings provided herein are to be regarded as illustrative in nature, and not as restrictive. It is not the intention of the applicant to in any way restrict or limit the scope of the appended claims to such detail. Additional embodiments and modifications will readily appear to those skilled in the art upon reading the present disclosure with reference to the accompanying drawings. The invention in its broader aspects is therefore not limited to the specific details, representative apparatus and methods, and illustrative examples shown an described. Accordingly, departures may be made from such details without departing from the scope or spirit of applicant's general inventive concept.

What is claimed is:

1. A watering device for animals, comprising:
a base unit defining a wall and an interior bowl portion for containing a volume of water;
a housing portion disposed in the base unit and extending into the interior bowl portion, the housing portion comprising an inlet port and an outlet port, wherein the inlet and outlet ports are in fluid communication with the interior bowl portion and are disposed on opposing sides of the housing portion;
a dispensing unit communicating with the outlet port to dispense water from the housing portion into the bowl portion via the outlet port proximate the wall, such that water continuously circulates around the housing portion within the bowl portion to the inlet port in a radial pattern; and
a filtering unit disposed between the inlet port and the outlet port to filter the water flowing from the interior bowl portion back to the housing portion via the inlet port.

2. The watering device of claim 1, wherein:
the housing portion includes an island located proximate a center of the bowl portion, and a neck portion extending between an inner wall of the bowl portion and the island, the neck portion having opposing sides to define the inlet port and the outlet port, respectively; and
the dispensing unit is configured to dispense water through the outlet port at a position substantially adjacent to the bottom surface of the bowl portion while the dispensing unit is in operation.

3. The watering device of claim 2, wherein the island includes an aperture to receive and accommodate a power cord for the dispensing unit.

4. The watering device of claim 2, further comprising:
a detachable cover forming a top surface of the island,
a first grate adjacent the inlet port, and
a second grate adjacent the outlet port.

5. The watering device of claim 2, wherein the dispensing unit is a water pump.

6. The watering device of claim 5, further comprising:
a sliding member slidably received adjacent the outlet port and in fluid communication with the water pump, wherein the sliding member contains an aperture configured to direct the pumped water through the outlet port.

7. The watering device of claim 6, wherein the aperture on the sliding member is located adjacent to the bottom surface of the watering bowl.

8. The watering device of claim 1, wherein the base unit is generally circular.

9. The watering device of claim 8, wherein the bowl portion is also generally circular.

10. The watering device of claim 9, wherein a bottom surface of the bowl portion is sloped to encourage the flow of water around the housing portion from the outlet port to the inlet port while the dispensing unit is in operation.

11. The watering device of claim 1, wherein the filtering unit defines a diaphragm-like member.

12. The watering device of claim 1, wherein the filtering unit is resides adjacent to the inlet port within the housing portion.

13. The watering device of claim 1, wherein the filtering unit is secured in place by mating slots disposed within the housing portion.

14. A method of delivering water to animals, comprising the steps of:
providing an animal watering device, the device comprising:
a base unit defining a wall and an interior bowl;
a housing portion in the base unit and extending into the interior bowl portion, wherein the housing portion comprises an inlet port and an outlet port, and wherein the inlet and outlet ports are in fluid communication with the interior bowl portion and are disposed on opposing sides of the housing portion;
a dispensing unit communicating with the outlet port to dispense water from the housing portion into the interior bowl portion via the outlet port; and
a filtering unit disposed between the inlet port and the outlet port;
placing a volume of water into the base unit;
activating the dispensing unit to cause the volume of water to circulate continuously from the outlet port, around the housing portion within the interior bowl portion, and to the inlet port in a radial pattern, and then through the filtering unit; and
delivering the filtered water back into the interior bowl portion via the outlet port.

15. The method of claim 14, wherein:
the housing portion defines an island located proximate a center of the bowl portion, and a neck portion extending between the wall of the bowl portion and the island, the neck portion having opposing sides to support the inlet port and the outlet port, respectively;
the dispensing unit pumps water through the outlet port at a location substantially adjacent to the bottom surface of the bowl portion; and
causing the water to circulate from the outlet port to the inlet port means causing water to circulate continuously around the island in a generally circular manner.

16. The method of claim 15, wherein:
the dispensing unit is a pump;
the island includes an aperture to receive and accommodate a power cord for the dispensing unit; and
activating the dispensing unit means using the power cord to provide power to the animal watering device.

17. The method of claim 15, wherein the animal watering device further comprises:
a detachable cover forming a top surface of the island,
a first grate adjacent the inlet port, and
a second grate adjacent the outlet port; and
wherein the neck portion also includes a cover, and a bottom surface of the bowl portion is sloped to encourage the flow of water around the island portion from the outlet port to the inlet port while the dispensing unit is in operation.

18. The method of claim 17, wherein:
the filtering unit resides adjacent to the inlet port within the neck portion.

* * * * *